United States Patent Office 3,189,624
Patented June 15, 1965

---

3,189,624
STEROID GEM DIFLUORIDES OF THE ANDROSTANE AND PREGNANE SERIES
John Fried, Plainfield, Glen E. Arth, Cranford, and William H. Jones, Metuchen, N.J., assignors to Merck & Co., Inc., Rahway, N.J., a corporation of New Jersey
No Drawing. Filed July 28, 1960, Ser. No. 45,793
6 Claims. (Cl. 260—397.5)

This invention is concerned generally with novel steroids and processes of preparing the same. More particularly, it relates to difluorosteroids and to processes for preparing difluorosteroids.

The compounds which are the subject of this invention are steroid-gem difluorides, especially (i) 3,3-difluoroandrostane-17β-ol and esters thereof having the following general formula:

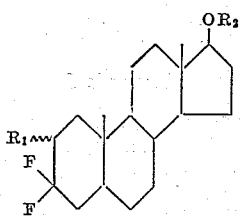

wherein $R_1$ can be either hydrogen or halogen, and $R_2$ can be an acyl group or hydrogen, (ii) 3,3-difluoro-4-androstene-17β-ol and esters thereof having the general formula:

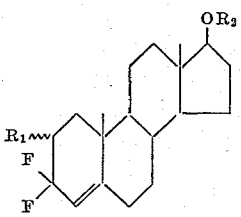

where $R_1$ can be either hydrogen or halogen, and $R_2$ can be an acyl group or hydrogen, (iii) 20,20-difluoro-5-pregnene-3β-ol and esters thereof having the following general formula:

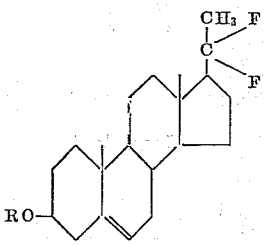

where R is an acyl group or hydrogen.

The steroid-gem difluorides of this invention such as 3,3-difluoro-androstane-17β-ol acetate, 3,3-difluoro-4-androstene-17β-ol acetate, 20,20-difluoro-5-pregnene-3β-ol acetate and 2-chloro-3,3-difluoro-androstane-17β-ol acetate are anti-androgenic agents. More over, these compounds at higher levels exhibit no androgenic activity.

Generally, gem difluorides may be prepared from ketones by the reaction of sulfur tetrafluoride with the particular ketone. The reaction of sulfur tetrafluoride with certain ketones has been found to require specific conditions for maximum yield of gem difluoride.

It is therefore an object of this invention to provide steroid-gem difluorides.

Another object of this invention is to provide a process whereby halogenated gem difluorides may be prepared.

A further object of this invention is to prepare pure steroid-gem difluorides.

Other objects of this invention will appear as the description proceeds.

It has been found that the compounds of the invention may be prepared by reacting sulfur tetrafluoride with a ketone steroid. The reaction, in order to proceed, requires the following conditions:

(1) A pressure greater than approximately 500 lbs. per square inch.
(2) An excess of sulfur tetrafluoride.
(3) Sulfur tetrafluoride solvent.

Preferably the molar ratio of sulfur tetrafluoride to keto steroid should be greater than approximately 50:1. It has also been found that technical grade sulfur tetrafluoride having the following composition:

| | | |
|---|---|---|
| (1) $SF_4$ | | 90–94%. |
| (2) Thionyl fluoride | | 5–9%. |
| (3) Chlorine | ⎫ | |
| (4) Sulfur monochloride | ⎬ | Approx. 1%. |
| (5) Sulfur dichloride | ⎭ | | when used in a reaction to make steroid-gem difluorides, wherein an excess of this steroid-gem difluoride is required, essentially all of the steroid is chlorinated in a position adjacent to the ketone gorup of the keto steroid. This can be explained by an example where excess sulfur tetrafluoride is required. Twelve grams of sulfur tetrafluoride are used to form 3,3-difluoro androstane-17β-ol acetate from 500 mgs. of androstane-17β-ol-3-one acetate, wherein a large portion of the sulfur tetrafluoride is used as a solvent. The sulfur tetrafluoride being commercial-grade can contain as much as 1% by weight of chlorine. In other words, 12 grams of sulfur tetrafluoride contains 0.12 gram of chlorine which is equal to 0.0016 mole of chlorine. Now, 500 mgs. of androstane-17β-ol-3-one acetate represents 0.0015 mole of that steroid, consequently, the probability is very high that 0.0015 mole of chlorinated steroid will be formed before any sulfur tetrafluoride will react with the steroid. Hence, the reaction mass will contain 2 chloro-3,3-difluoro androstane-17β-ol acetate when commercial sulfur tetrafluoride is reacted with androstane-17β-ol-3-one acetate.

Consequently, in order to make steroid-gem difluorides wherein no chlorination will take place, the chlorination agents in the commercial sulfur tetrafluoride must be removed prior to the reaction of sulfur tetrafluoride with the keto steroids. The removal of chlorinating agents is facilitated by the intimate contact of the commercial-grade of sulfur tetrafluoride with mercury.

In carrying out the process of the present invention heretofore described in the example, the following procedure is outlined: A keto steroid is placed in a bomb. To this bomb commercial-grade sulfur tertafluoride is added whereby the ratio of sulfur tetrafluoride to keto-steroid is greater than approximately 50:1. The bomb is closed and heated to a temperature of approximately 80° C. for two hours. During this time interval, the pressure in the bomb reaches a range of approximately 1000–2000 lbs. per square inch. The compound formed by this process is the gem-difluoro alpha-chloro steroid.

In order to make the pure gem-difluoro steroid, the following general procedure is used: The keto-steroid to be fluorinated is placed in a bomb. To this bomb sulfur tetrafluoride which has been previously separated from chlorinating agents is added. The molar ratio of sulfur tetrafluoride to keto-steroid is greater than 50:1. The bomb is closed and heated at a temperature of 50° C. for a period of greater than two hours. During this time interval, the pressure in the bomb is in the range of 1000–2000 lbs. per square inch. The compound formed by using this procedure is the steroid gem-difluoride.

The following examples illustrate methods of carrying out the present invention, but it is to be understood that these examples are given for purposes of illustration and not of limitation.

*Example 1*

500 mg. of androstane-17β-ol-3-one acetate having the structure:

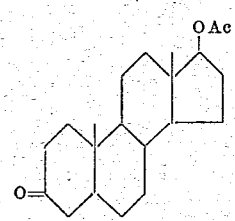

is placed in a stainless steel bomb having a volume of 20 cc. To this bomb, 12 g. of sulfur tetrafluoride (technical) and 0.05 ml. of boron trifluoride diethyl ether

$[(BF_3).(C_2H_5)_2O]$ is added. The bomb is closed and heated at a temperature of 80° C. for two hours. During this time interval, the pressure in the bomb should be in the range of 1000–2000 p.s.i.g. A compound is formed having the following structure:

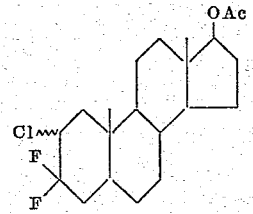

(2-chloro-3,3-difluoro-androstane-17β-ol acetate)
M.P. 180–182° C. Fd.: C, 64.35; H, 7.99; Cl, 9.51; F, 8.71.

*Example 2*

An experiment is carried out similar to that of Example 1 using androstene-17β-ol-3-one acetate, except that the sulfur tetrafluoride used is purified by the following process:

A bomb of carbon steel construction containing one pound of sulfur tetrafluoride (technical) having a volume of 500 cc., at a temperature of 26° C. and a pressure of 150 p.s.i.g., is immersed in a Dry Ice-acetone slurry for a period of one hour. The temperature of the sulfur tetrafluoride (technical) is thereby reduced to —80° C.

SF₄ (technical) has the following composition:

(1) SF₄ _____ 90–94% (by weight).
(2) Thionlyl fluoride _____ 5–9%.
(3) Chlorine _____⎫
(4) Sulfur monochloride _____⎬ Approx. 1%.
(5) Sulfur dichloride _____⎭

The pressure within the bomb is then very much lower than atmospheric. 100 g. of liquid mercury is then added to the bomb through an open valve. After this mercury is introduced into the bomb, the valve is closed. The bomb is then removed from the Dry Ice-acetone slurry and exposed to room temperature for about one hour. The bomb is then agitated by shaking for 16 hours in a Rocking Shaker (manfactured by the American Instrument Company) operating at 36 r.p.m. The valve on the bomb is then connected to the valve on a second bomb by a steel tube. The second steel bomb, having a volume of 500 cc. is evacuated and placed in a Dry Ice-acetone slurry.

The valves on the bombs are opened and the SF₄ in the original bomb distilled into the second bomb, leaving the liquid mercury in the first bomb. This distilled SF₄ contains no chlorinating agents.

The product formed has the following structure:

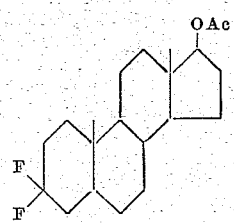

(3,3-difluoro-androstane-17β-ol acetate)
M.P. 135–137° C. Fd.: C, 70.90; H, 9.19; F, 9.52.

*Example 3*

250 mg. of 4-androstene-17β-ol-3-one acetate is placed in a stainless steel bomb having a volume of 20 cc. To this bomb, two drops of a 10% solution of boron trifluoride etherate is added. The bomb is then closed and cooled to —80° C. 19.5 g. of sulfur tetrafluoride purified by the process described in Example 2 is distilled into the bomb and the valve on the bomb is closed. The mixture is heated inside the bomb at 80° C. for two hours at a pressure of approximately 1500 p.s.i.g. After this period of time, the contents of the bomb are removed and extracted with chloroform. The chloroform extract is washed with an excess amount of aqueous sodium bicarbonate. The extract is then dried and evaporated. The solid which is obtained is then extracted with petroleum ether. This petroleum ether extract is dried, and a compound having the following structure is obtained:

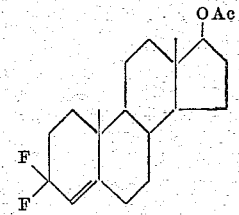

(3,3-difluoro-4-androstene-17β-ol acetate)

*Example 4*

1 g. of 5 pregnene-3β-ol-20-one acetate is placed in a 20 cc. stainless steel bomb. The bomb is cooled to —80° C. To the bomb 19 g. of sulfur tetrafluoride purified by the process of Example 2 is added. Also added to the bomb is 0.10 ml. of a 10% solution in ether of boron trifluoride etherate. The valve on the bomb is closed and the bomb is heated for two hours at 80° C. and at a pressure of 1000 p.s.i.g. The bomb is then allowed to cool to room temperature (approximately 25° C.) and remain at 25° C. for 20 hours. The bomb is then vented. The contents of the bomb are extracted with chloroform. The chloroform extract is dried, and the residue is then extracted with petroleum ether. A compound having the following structure is obtained:

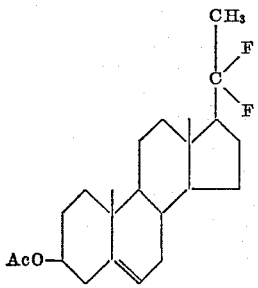

(20,20-difluoro-5-pregnene 3β-ol-acetate)

Various changes and modifications may be made in carrying out the present invention without departing from the spirit and scope thereof. Insofar as these changes and modifications are within the purview of the annexed claims, they are to be considered as part of our invention.

What is claimed is:

1. The process for the production of 3,3-difluoro-androstane-17β-ol acetate comprising the steps of reacting androstane-17β-ol-3-one acetate with sulfur tetrafluoride, said sulfur tetrafluoride being free of chlorinating agents, in the presence of boron trifluoride etherate, the molar ratio of sulfur tetrafluoride to androstane-17β-ol-3-one acetate being in the range of 50 to 1 up to approximately 200 to 1.

2. 20,20-difluoro-5-pregnene 3β-ol compounds having the following formula:

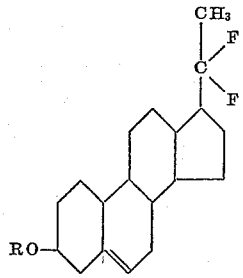

wherein R is selected from the group consisting of lower hydrocarbon acyl and hydrogen.

3. 2 chloro-3,3-difluoro-androstane-17β-ol acetate.
4. 3,3-difluoro-androstane-17β-ol acetate.
5. 3,3-difluoro-4-androstene-17β-ol acetate.
6. 20,20-difluoro-5-pregnene-3β-ol acetate.

No references cited.

LEWIS GOTTS, *Primary Examiner.*

L. H. GASTON, IRVING MARCUS, *Examiners.*